(12) United States Patent
Zimmermann et al.

(10) Patent No.: US 8,034,435 B2
(45) Date of Patent: Oct. 11, 2011

(54) PLASTIC FILM WITH A MULTILAYERED INTERFERENCE COATING

(75) Inventors: Andreas Zimmermann, Griesheim (DE); Fumio Kita, Wiesbaden (DE); Anette Berni, Kaeshofen (DE); Martin Mennig, Quierschied (DE); Peter W. Oliveira, Saarbruecken (DE); Helmut Schmidt, Saarbruecken-Guedingen (DE); Takamasa Harada, Chiba (JP)

(73) Assignee: Tomoegawa Co., Ltd., Tokyo (JP)

( * ) Notice: Subject to any disclaimer, the term of this patent is extended or adjusted under 35 U.S.C. 154(b) by 694 days.

(21) Appl. No.: 10/508,193

(22) PCT Filed: Mar. 14, 2003

(86) PCT No.: PCT/EP03/02676
§ 371 (c)(1),
(2), (4) Date: May 4, 2005

(87) PCT Pub. No.: WO03/080328
PCT Pub. Date: Oct. 2, 2003

(65) Prior Publication Data
US 2006/0057398 A1 Mar. 16, 2006

(30) Foreign Application Priority Data
Mar. 22, 2002 (DE) .................... 102 13 036

(51) Int. Cl.
*B32B 7/02* (2006.01)
(52) U.S. Cl. ........ 428/212; 428/220; 428/328; 428/426; 428/701; 428/702; 427/487; 427/162; 427/385.5; 427/407.1; 427/428.11
(58) Field of Classification Search .................. 428/328, 428/426, 701, 702, 212, 220; 427/487, 162, 427/385.5, 407.1, 428.11
See application file for complete search history.

(56) References Cited

U.S. PATENT DOCUMENTS

| | | | |
|---|---|---|---|
| 5,134,021 A | 7/1992 | Hosono et al. | |
| 5,654,090 A | 8/1997 | Kayanoki | |
| 5,695,895 A | 12/1997 | Johnson et al. | |
| 5,858,077 A | 1/1999 | Kayanoki | |
| 5,876,857 A | 3/1999 | Schuhmann et al. | |
| 5,935,717 A | 8/1999 | Oishi et al. | |
| 5,976,297 A * | 11/1999 | Oka et al. ..................... | 156/241 |
| 6,008,285 A | 12/1999 | Kasemann et al. | |
| 6,228,921 B1 | 5/2001 | Kasemann et al. | |
| 6,236,493 B1 | 5/2001 | Schmidt et al. | |
| 6,268,961 B1 | 7/2001 | Nevitt et al. | |
| 6,280,835 B1 | 8/2001 | Matsui | |
| 6,291,070 B1 | 9/2001 | Arpac et al. | |
| 6,521,677 B2 | 2/2003 | Yashiro et al. | |
| 6,855,396 B1 | 2/2005 | Mennig et al. | |

| | | |
|---|---|---|
| 2004/0246584 A1 | 12/2004 | Ahn et al. |
| 2005/0008846 A1 | 1/2005 | Harada et al. |
| 2005/0101698 A1 | 5/2005 | Harada et al. |

FOREIGN PATENT DOCUMENTS

| | | |
|---|---|---|
| DE | 195 11 627 | 10/1995 |
| DE | 197 19 948 | 11/1998 |
| EP | 0 437 902 | 1/1990 |
| EP | 0 671 638 | 3/1995 |
| WO | WO 94/29768 | 12/1994 |
| WO | WO 95/13326 | 5/1995 |
| WO | WO 97/38333 | 10/1997 |
| WO | WO 01/22130 | 3/2001 |
| WO | WO 03/005072 | 1/2003 |

OTHER PUBLICATIONS

International Search Report dated Apr. 2, 2003, for International Application No. PCT/EP02/13846, cited herewith as Document US6.
International Search Report dated May 19, 2003, for International Application No. PCT/EP03/00020, cited herewith as Document US7.
International Search Report dated Jul. 14, 2003, for International Application No. PCT/EP03/02676, currently pending as U.S. Appl. No. 10/508,193.
Ex parte Berni, Decision by the Board of Patent Appeals and Interferences regarding U.S. Appl. No. 10/944,741 (Dec. 16, 2008).
Notifice of International Preliminary Examination Report (PCT/IPEA/416) and International Preliminary Examination Report (Form PCT/IPEA/409) for PCT/EP03/02676, Oct. 2002.
International Search Report (PCT/IPEA/210) along with English Language Translation of International Search Report (Form PCT/IPEA/210) for PCT/EP03/02676, Feb. 2003.
Notifice of International Preliminary Examination Report (PCT/IPEA/416) and International Preliminary Examination Report (Form PCT/IPEA/409) along with English Language Notification of Transmittal of Translation of the International Preliminary Examination Report (Form PCT/IB/338 ) and English Language Translation of International Preliminary Examination Report (Form PCT/IPEA/409) for PCT/EP02/13846, Jan. 2004.
International Search Report (PCT/IPEA/210) and along with English Language Translation of International Search Report (Form PCT/IPEA/210) for PCT/EP02/13846, Jul. 2003.
International Preliminary Examination Report (Form PCT/IPEA/409) along with English Language Translation of International Preliminary Examination Report (Form PCT/IB/409 ) for PCT/EP03/00020, Jan. 2004.
International Search Report (PCT/IPEA/210) and along with English Language Translation of International Search Report (Form PCT/IPEA/210) for PCT/EP03/00020, Apr. 2003.

* cited by examiner

Primary Examiner — David Sample
Assistant Examiner — Lawrence Ferguson
(74) Attorney, Agent, or Firm — Sterne, Kessler, Goldstein & Fox PLLC

(57) ABSTRACT

The invention relates to a plastic film with an interference multilayer system applied thereon that comprises at least two layers. Said layers can be obtained by hardening and/or applying thermal treatment to a coating composition containing nanoscale inorganic solid particles having polymerizable and/or polycondensable organic surface groups, thereby forming a layer that is crosslinked by means of the polymerizable and/or polycondensable organic surface groups. The films can be used as an optical laminating film.

15 Claims, No Drawings

PLASTIC FILM WITH A MULTILAYERED INTERFERENCE COATING

This application is a United States National Stage Patent Application under 35 U.S.C. §371 of International Patent Application No. PCT/EP03/02676, filed Mar. 14, 2003, which claims priority to German Patent Application No. 102 13 036.1, filed Mar. 22, 2002.

The invention relates to a polymer film with a multilayer interference system applied to it, to a process for producing said film, to a composite material comprising a substrate laminated with a polymer film with a multilayer interference system, and to uses of said film and of said material.

Films of polymeric material which carry interference layer assemblies on one side are required, for example, for specialty filters or for certain optical applications in architecture or in vehicle construction, particularly for specialty glazing, where they may be used as antireflection, NIR reflection, IR reflection or color filter layers. The polymer films with the interference layer assemblies are laminated, for example, to solid sheets of glass or plastic. Prior art interference layer assemblies comprising optical layers of high and low refractive index ($\lambda/4$ layers) are deposited by vacuum coating techniques (sputtering). With these techniques, however, the deposition rates which can be realized are low, and this is reflected in the high price of the films. Only purely inorganic layers can be applied by the sputtering technique.

Also known from the prior art are wet-chemical, sol-gel process coatings. However, it has so far proven possible to apply these coatings not to flexible polymer films but only to rigid or solid glass substrates, such as flat glass and spectacle glass, or plastics substrates such as polycarbonate sheets. The rigid substrates have been coated using dipping or spin coating techniques, which are unsuited to the coating of flexible films.

Moreover, it is known that that flexible polymer films may be provided with other functional coatings by wet-chemical methods for the purpose, for example, of producing magnetic tapes for audio or video cassettes, inkjet overhead films, or foils for surface decoration by means of hot stamping. This is done using film coating methods, examples being knife coating (doctor blade coating), slot die coating, kiss coating with spiral scrapers, meniscus coating, roll coating or reverse-roll coating.

The production of multilayer optical interference systems films with these wet-chemical coating techniques, however, is unknown.

It is an object of the invention to provide a simple process for producing multilayer optical interference systems on polymer films, and corresponding products, without the need for complicated and thus costly vacuum coating techniques.

The invention provides a polymer film on which there has been applied a multilayer optical interference system comprising at least two layers each obtainable by solidifying and/or heat-treating a coating composition comprising nanoscale inorganic particulate solids having polymerizable and/or polycondensable organic surface groups to form a layer which is crosslinked by way of the polymerizable and/or polycondensable organic surface groups. Each of the layers obtained is an organically modified inorganic layer.

The solidification can be brought about by heat treatment, light exposure (UV, Vis), simple standing at room temperature, or a combination of these measures.

The invention further provides a process for producing this polymer film with multilayer interference coating, which comprises the following steps:

a) applying a coating sol comprising nanoscale inorganic particulate solids having polymerizable and/or polycondensable organic surface groups to the polymer film,
b) solidifying the coating sol applied in a), where appropriate with crosslinking of the polymerizable and/or polycondensable organic surface groups of the particulate solids, to form an at least partly organically crosslinked layer,
c) applying a further coating sol comprising nanoscale inorganic particulate solids having polymerizable and/or polycondensable organic surface groups to the layer solidified in b),
d) solidifying the coating sol applied in c), where appropriate with crosslinking of the polymerizable and/or polycondensable organic surface groups of the particulate solids, to form a further solidified layer,
e) if desired, repeating steps c) and d) one or more times to form solidified layers, and
f) heat-treating and/or irradiating the resultant layer assembly, it being possible to perform this step together with step d) for the topmost layer.

Steps b) and d) are carried out by heat treatment, irradiation (UV, Vis), simple standing at room temperature, or a combination of these methods.

In step f) a heat treatment is preferable.

A multilayer interference system is composed of at least two layers of materials having different refractive indices. A fraction of the incident light is reflected at each of the interfaces between the layers. Depending on the material and the thickness of the layers, the reflections are extinguished (negative interference) or intensified (positive interference).

Surprisingly it has been found that with the coating composition used in accordance with the invention it is possible to provide polymer films with a multilayer interference system in a wet-chemical film coating process. In accordance with the invention the desired refractive indices for each layer can be set in a targeted way by selection of the coating compositions, with the at least two layers having different refractive indices.

In the present description "nanoscale inorganic particulate solids" are in particular those having an average particle diameter of not more than 200 nm, preferably not more than 100 nm, and in particular not more than 70 nm, e.g., from 5 to 100 nm, preferably from 5 to 70 nm. One particularly preferred particle size range is from 5 to 10 nm.

The nanoscale inorganic particulate solids may be composed of any desired materials but are preferably composed of metals and in particular metal compounds such as (optionally hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$, chalcogenides such as sulfides (e.g., CdS, ZnS, PbS, an $Ag_2S$), selenides (e.g., GaSe, CdSe, and ZnSe), and tellurides (e.g., ZnTe or CdTe), halides such as AgCl, AgBr, AgI, CuCl, CuBr, $CdI_2$, and $PbI_2$; carbides such as $CdC_2$ or SiC; arsenides such as AlAs, GaAs, and, GeAs; antimonides such as InSb; nitrides such as BN, AlN, $Si_3N_4$, and $Ti_3N_4$; phosphides such as GaP, InP, $Zn_3P_2$, and $Cd_3P_2$; phosphates, silicates, zirconates, aluminates, stannates, and the corresponding mixed oxides (e.g., indium-tin oxides (ITO) and those with perovskite structure such as $BaTiO_3$ and $PbTiO_3$).

The nanoscale inorganic particulate solids used in the process of the invention are preferably (optionally hydrogenated) oxides, sulfides, selenides, and tellurides of metals and mixtures thereof. Preferred in accordance with the invention are nanoscale particles of $SiO_2$, $TiO_2$, $ZrO_2$, ZnO, $Ta_2O_5$, $SnO_2$, and $Al_2O_3$ (in all modifications, especially as boehmite, AlO(OH)), and mixtures thereof. It has proven to be the case that $SiO_2$ and/or $TiO_2$ as nanoscale inorganic particulate solids for the particulate solids having polymerizable and/or polycondensable organic surface groups produce coating compositions particularly suitable for film coating. The nanoscale particles still contain reactive groups on the surfaces; for example, on the surfaces of oxide particles there are generally hydroxide groups.

Since the nanoscale particles which can be used in accordance with the invention span a broad range of refractive indices, appropriate selection of these nanoscale particles allows the refractive index of the layer(s) to be set easily to the desired value.

The nanoscale particulate solids used in accordance with the invention may be produced conventionally: for example, by flame pyrolysis, plasma processes, gas-phase condensation processes, colloid techniques, precipitation processes, sol-gel processes, controlled nucleation and growth processes, MOCVD processes, and (micro)emulsion processes. These processes are described in detail in the literature. It is possible in particular to draw, for example, on metals (for example, after the reduction of the precipitation processes), ceramic oxidic systems (by precipitation from solution), and also saltlike or multicomponent systems. The saltlike or multicomponent systems also include semiconductor systems.

Use may also be made of commercially available nanoscale inorganic particulate solids. Examples of commercially available nanoscale $SiO_2$ particles are commercial silica products, e.g., silica sols, such as the Levasils®, silica sols from Bayer AG, ®Klebosol from Clariant, or fumed silicas, e.g., the Aerosil products from Degussa.

The preparation of the nanoscale inorganic particulate solids provided with polymerizable and/or polycondensable organic surface groups that are used in accordance with the invention may in principle be carried out in two different ways, namely first by surface modification of pre-prepared nanoscale inorganic particulate solids and secondly by preparation of these inorganic nanoscale particulate solids using one or more compounds which possess such polymerizable and/or polycondensable groups. These two ways are elucidated later on below and in the examples.

The organic polymerizable and/or polycondensable surface groups may comprise any groups known to the skilled worker that are amenable to free-radical, cationic or anionic, thermal or photochemical polymerization or to thermal or photochemical polycondensation, with one or more suitable initiators and/or catalysts possibly being present. The expression "polymerization" here also includes polyaddition. The initiators and/or catalysts which may be used where appropriate for the respective groups are known to the skilled worker. In accordance with the invention preference is given to surface groups which possess a (meth)acryloyl, allyl, vinyl or epoxy group, with (meth)acryloyl and epoxy groups being particularly preferred. The polycondensable groups include in particular hydroxyl, carboxyl, and amino groups, by means of which ether, ester, and amide linkages can be obtained between the nanoscale particles.

As already mentioned, the polymerizable and/or polycondensable surface groups may in principle be provided in two ways. Where surface modification of pre-prepared nanoscale particles is carried out, compounds suitable for this purpose are all those (preferably of low molecular mass) which on the one hand possess one or more groups which are able to react or at least interact with reactive groups present on the surface of the nanoscale particulate solids (such as OH groups, for example, in the case of oxides) and on the other hand contain at least one polymerizable and/or polycondensable group. Surface modification of the nanoscale particles may be accomplished, for example, by mixing them with suitable compounds elucidated below, where appropriate in a solvent and in the presence of a catalyst. Where the surface modifiers are silanes, it is sufficient, for example, to stir them with the nanoscale particles at room temperature for a number of hours.

Accordingly, the corresponding compounds may, for example, form not only covalent but also ionic (saltlike) or coordinative (complex) bonds to the surface of the nanoscale particulate solids, whereas simple interactions include, for example, dipole-dipole interactions, hydrogen bonding, and van der Waals interactions. Preference is given to the formation of covalent and/or coordinate bonds.

In accordance with the invention it is also preferred for the organic groups which are present on the surfaces of the nanoscale particles and which include the polymerizable and/or polycondensable groups to have a relatively low molecular weight. In particular, the molecular weight of the (purely organic) groups should not exceed 500 g/mol and preferably 300 g/mol, more preferably 200 g/mol. This does not of course rule out the compounds (molecules) containing these groups having a significantly high molecular weight (e.g., up to 1000 g/mol or more).

Examples of organic compounds which can be used to modify the surfaces of the nanoscale inorganic particulate solids include unsaturated carboxylic acids, β-dicarbonyl compounds, e.g., β-diketones or β-carbonylcarboxylic acids, having polymerizable double bonds, ethylenically unsaturated alcohols and amines, amino acids, and epoxides and diepoxides. Compounds used with preference for surface modification are diepoxides, β-diketones, methacryloylsilanes, and epoxysilanes.

Specific examples of organic compounds for surface modification are diepoxides such as 3,4-epoxycyclohexylmethyl 3,4-epoxycyclohexanecarboxylate, bis(3,4-epoxycyclohexyl)adipate, cyclohexanedimethanol diglycidyl ether, neopentylglycol diglycidyl ether, 1,6-hexanediol diglycidyl ether, propylene glycol diglycidyl ether, bisphenol A diglycidyl ether, bisphenol F diglycidyl ether, and unsaturated carboxylic acids such as acrylic acid and methacrylic acid.

Further particularly preferred compounds for surface modification of the nanoscale inorganic particulate solids are in particular, in the case of oxidic particles, hydrolytically condensable silanes having at least (and preferably) one non-hydrolyzable radical which possesses an polymerizable and/or polycondensable group, this being preferably a polymerizable carbon-carbon double bond or an epoxy group. Silanes of this kind preferably have the formula (I):

$$X-R^1-SiR^2_3 \qquad (I)$$

in which X is $CH_2=CR^3-COO$, $CH_2=CH$, epoxy, glycidyl or glycidyloxy, $R^3$ is hydrogen or methyl, $R^1$ is a divalent hydrocarbon radical having 1 to 10, preferably 1 to 6, carbon atoms, which if desired contains one or more heteroatom groups (e.g., O, S, NH), which separate adjacent carbon atoms from one another, and the radicals $R^2$, identical to or different from one another, are selected from alkoxy, aryloxy, acyloxy, and alkylcarbonyl groups and also halogen atoms (especially F, Cl and/or Br).

The groups $R^2$ may be different from one another but are preferably identical. The groups $R^2$ are preferably selected from halogen atoms, $C_{1-4}$ alkoxy groups (e.g., methoxy, ethoxy, n-propoxy, isopropoxy and butoxy), $C_6$-$C_{10}$ aryloxy groups (e.g., phenoxy), $C_{1-4}$ acyloxy groups (e.g., acetoxy and propionyloxy), and $C_{2-10}$ alkylcarbonyl groups (e.g., acetyl). Particularly preferred radicals $R^2$ are $C_{1-4}$ alkoxy groups and especially methoxy and ethoxy.

The radical $R^1$ is preferably an alkylene group, especially one having 1 to 6 carbon atoms, such as methylene, ethylene, propylene, butylene, and hexylene, for example. If X is $CH_2=CH$, $R^1$ is preferably methylene and in this case may also simply be a bond.

X is preferably $C_2=CR^3$—COO (where $R^3$ is preferably $CH_3$) or glycidyloxy. Accordingly, particularly preferred silanes of the formula (I) are (meth)acryloxyalkyltrialkoxysilanes, such as 3-methacryloxypropyltrimethoxysilane and 3-methacryloxypropyltriethoxysilane, for example, and glycidyloxyalkyltrialkoxysilanes, such as 3-glycidyloxypropyltrimethoxysilane and 3-glycidyloxypropyltriethbxysilane, for example.

Where the nanoscale inorganic particulate solids are actually prepared using one or more compounds which possess polymerizable and/or polycondensable groups it is possible to forego subsequent surface modification, although such modification is of course possible as an additional measure.

The in situ preparation of nanoscale inorganic particulate solids having polymerizable and/or polycondensable surface groups is elucidated below, taking $SiO_2$ particles as example. For this purpose the $SiO_2$ particles, for example, can be prepared by the sol-gel process using at least one hydrolytically polycondensable silane having at least one polymerizable and/or polycondensable group. Suitable such silanes include, for example, the above-described silanes of the formula (I). These silanes are used either alone or in combination with a suitable silane of the formula (II)

$$SiR^2{}_4 \qquad (II)$$

in which $R^2$ is as defined above. Preferred silanes of the above formula (II) are tetramethoxysilane and tetraethoxysilane.

In addition to or alternatively to the silanes of the formula (II) it is of course also possible to use other hydrolyzable silanes, examples being those which possess at least one nonhydrolyzable hydrocarbon group without a polymerizable and/or polycondensable group, such as methyl- or phenyltrialkoxysilanes, for example. These may be silanes of the formula (III)

$$R^4{}_n SiR^2{}_{4-n} \qquad (III)$$

in which $R^2$ is as defined above and the nonhydrolyzable radical $R^4$ is an alkyl group, preferably $C_{1-6}$ alkyl, such as methyl, ethyl, n-propyl, isopropyl, n-butyl, s-butyl and t-butyl, pentyl or hexyl, for example, a cycloalkyl group having 5 to 12 carbon atoms, such as cyclohexyl, or an aryl group, preferably $C_{6-10}$ aryl, such as phenyl or naphthyl, for example, and n is 1, 2 or 3, preferably 1 or 2, and especially 1. Said radical $R^4$ may if desired have one or more customary substituents, such as halogen, ether, phosphoric acid, sulfonic acid, cyano, amido, mercapto, thioether or alkoxy groups, for example.

In the process of the invention a coating composition comprising the aforementioned nanoscale inorganic particulate solids is applied to the polymer film or to a layer which has already been applied. The applied coating composition is in particular a coating sol, i.e., a dispersion of the above-defined nanoscale inorganic particulate solids having polymerizable and/or polycondensable organic surface groups in a solvent or solvent mixture. The coating composition is fluid on application.

The solvent may be any solvent known to the skilled worker. The solvent may be, for example, water and/or an organic solvent. The organic solvent is preferably miscible with water. Examples of suitable organic solvents are alcohols, ethers, ketones, esters, amides, and mixtures thereof. Preference is given to using alcohols, e.g., aliphatic or alicyclic alcohols, or alcohol mixtures, as solvent, preference being given to monohydric alcohols. Preferred alcohols are linear or branched monovalent alkanols having 1 to 8, preferably 1 to 6, carbon atoms. Particularly preferred alcohols are methanol, ethanol, n-propanol, 2-propanol, n-butanol, 2-butanol, isobutanol, tert-butanol or mixtures thereof.

The solvent or part of it may also be formed during the preparation of the nanoscale particles or during the surface modification. For example, the preparation of $SiO_2$ particles from alkoxysilanes is accompanied by liberation of the corresponding alcohols, which can then act as solvents.

It has surprisingly been found that the coating sols for the coating in accordance with the invention are especially suitable when they are used in highly diluted form for application. The total solids content of the coating sol to be applied is advantageously not more than 40% by weight, preferably not more than 20% by weight, in particular not more than 15% by weight. The total solids content is preferably from 0.5 to 5% by weight, more preferably from 1 to 3% by weight.

Provided the total solids content of the coating sol is not more than 40% by weight, excellent coatings can be obtained on the polymer films. If the coating sol is in a low dilution, i.e., has a relatively high total solids content, high wet film thicknesses of the coating cannot be achieved. Suitable wet film thicknesses of the applied coating sol are situated typically in the lower μm range, e.g., from 0.5 μm to 10 μm.

An additional constituent of the coating sol may be, for example, at least one monomeric or oligomeric species possessing at least one group which is able to react (undergo polymerization and/or polycondensation) with the polymerizable and/or polycondensable groups present on the surface of the nanoscale particles. Suitable such species include, for example, monomers having a polymerizable double bond, such as acrylates, methacrylates, styrene, vinyl acetate, and vinyl chloride, for example. Preferred monomeric compounds having more than one polymerizable bond are, in particular, those of the formula (IV):

$$(CH_2=CR^3-COZ-)_m-A \qquad (IV)$$

in which
m=2, 3 or 4, preferably 2 or 3, and especially 2,
Z=O or NH, preferably O,
$R^3$=H, $CH_3$,
A=m-valent hydrocarbon radical which has 2 to 30, especially 2 to 20, carbon atoms and can contain one or more heteroatom groups located in each case between two adjacent carbon atoms (examples of such heteroatom groups are O, S, NH, NR(R=hydrocarbon radical), preferably O).

The hydrocarbon radical A may also carry one or more substituents selected preferably from halogen (especially F, Cl and/or Br), alkoxy (especially $C_{1-4}$ alkoxy), hydroxyl, unsubstituted or substituted amino, $NO_2$, $OCOR^5$, $COR^5$ ($R^5=C_{1-6}$ alkyl or phenyl). Preferably, however, the radical A is unsubstituted or is substituted by halogen and/or hydroxyl.

In one embodiment of the present invention A is derived from an aliphatic diol, an alkylene glycol, a polyalkylene glycol, or an optionally alkoxylated (e.g., ethoxylated) bisphenol (e.g., bisphenol A).

Further useful compounds having more than one double bond are, for example, allyl (meth)acrylate, divinylbenzene, and diallyl phthalate. Similarly, for example, a compound having two or more epoxy groups can be used (in the case where epoxide-containing surface groups are used), e.g., bisphenol A diglycidyl ether, or else an (oligomeric) precondensate of an epoxy-functional hydrolyzable silane such as glycidoxypropyltrimethoxysilane.

The fraction of organic components in the coating sols used in accordance with the invention is preferably not more than 20% by weight, e.g., from 4 to 15% by weight, based on the total solids content. For layers of high refractive index, for example, it can be 5% by weight, for layers with low refractive index, for example, 15% by weight. Preferably, however, no such organic components are used.

The coating sol used in accordance with the invention preferably has a pH≧3, more preferably ≧4. Generally speaking the pH is situated within the neutral range up to about 8, preferably up to about 7.5.

If desired, further additives, customary for film coatings, may also be added to the coating sol. Examples are thermal or photochemical crosslinking initiators, sensitizers, wetting auxiliaries, adhesion promoters, leveling agents, antioxidants, stabilizers, crosslinking agents, metal colloids, e.g., as carriers of optical functions. Besides the thermal or photochemical crosslinking initiators which may be used, and which are elucidated later on, however, the coating sol contains no further components; in other words, the coating sol or coating composition consists preferably of the nanoscale particulate solids having polymerizable and/or polycondensable organic surface groups, the solvent or solvents, and, if desired, one or more thermal or photochemical crosslinking initiators.

Unlike other rigid substrates, films are flexible and therefore require special coating techniques and coating compositions. The polymer film to be coated may be a conventional film customary in the art, preferably a film of limited length. Specific examples are films of polyethylene, e.g., HDPE or LDPE, polypropylene, cellulose triacetate (TAC), polyisobutylene, polystyrene, polyvinyl chloride, polyvinylidene chloride, polytetrafluoroethylene, polychlorotrifluoroethylene, polyamide, poly(meth)acrylates, polyethylene terephthalate, polycarbonate, regenerated cellulose, cellulose nitrate, cellulose acetate, cellulose triacetate, cellulose acetate butyrate or rubber hydrochloride. The polymer film is preferably transparent. It is of course also possible to use composite films formed, for example, from the materials mentioned above.

The polymer film may have been pretreated. Prior to coating in accordance with the invention it may undergo, for example, a corona treatment or may be provided with a precoat, in order for example to promote adhesion, with a hard coat and/or with an antiglare coating.

In step a) of the process of the invention the coating sol is applied to the polymer film by a film coating process in order to coat all or part of said film (on one side). Coating takes place on individual film sections or, preferably, in a continuous coating process. Suitable coating processes are the conventional film coating processes known to the skilled worker. Examples thereof are knife coating (doctor blade coating processes), slot die coating, kiss coating with spiral scrapers, meniscus coating, roll coating or reverse-roll coating.

For the process of the invention, reverse-roll coating has proven particularly appropriate. In this process, the coating sol is taken up by a dip roll and transferred via a meniscus coating step, using a transfer roll, to a pressure roll (master roll). Given appropriately high precision of the rolls and of the drives, the nip between two rolls is sufficiently constant. The wet film present on the pressure roll is then deposited, usually completely, on the substrate film. As a result, the thickness of the wet film deposite on the substrate film is independent of any fluctuations in the thickness of the substrate film. Through the use of the reverse-roll process it is possible, surprisingly, to apply particularly precise and uniform multilayer interference systems to polymer films, and so the use of this process constitutes one particularly preferred embodiment of the process of the invention.

Before being applied to this film, the coating sol can be adjusted to a suitable viscosity or to a suitable solids content by means, for example, of addition of solvent. This involves preparation in particular of the highly diluted coating sols set out above. Application may be followed by a drying step, particularly when crosslinking is not carried out by a heat treatment.

In step b) of the process of the invention the coating sol applied in a) is solidified, by evaporating the solvent and/or by crosslinking the polymerizable and/or polycondensable surface groups of the nanoscale inorganic particulate solids, for example (where appropriate by way of the polymerizable and/or polycondensable groups of the monomeric or oligomeric species additionally used). Crosslinking may be carried out by means of customary polymerization and/or polycondensation reactions in the manner familiar to the skilled worker.

Examples of suitable crosslinking methods are thermal and photochemical (e.g., UV) crosslinking, electron beam curing, laser curing or room-temperature curing. Crosslinking takes place where appropriate in the presence of a suitable catalyst or initiator, which is added to the coating sol no later than immediately before application to the film.

Suitable initiators/initiator systems include all commonplace initiators/initiator systems known to the skilled worker, including free-radical photoinitiators, free-radical thermoinitiators, cationic photoinitiators, cationic thermoinitiators, and any desired combinations thereof.

Specific examples of free-radical photoinitiators which can be used include Irgacure® 184 (1-hydroxycyclohexyl phenyl ketone), Irgacure® 500 (1-hydroxycyclohexyl phenyl ketone, benzophenone), and other Irgacure® photoinitiators available from Ciba-Geigy; Darocur® 1173, 1116, 1398, 1174, and 1020 (available from Merck); benzophenone, 2-chlorothioxanthone, 2-methylthioxanthone, 2-isopropyl-thioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone, and dibenzosuberone.

Examples of free-radical thermoinitiators include organic peroxides in the form of diacyl peroxides, peroxydicarbonates, alkyl peresters, alkyl peroxides, perketals, ketone peroxides, and alkyl hydroperoxides, and also azo compounds. Specific examples that might be mentioned here include, in particular, dibenzoyl peroxide, tert-butyl perbenzoate, and azobisisobutyronitrile. Where epoxy groups are present for the crosslinking it is possible to use, as thermoinitiators, compounds containing amine groups. An example is an aminopropyltrimethoxysilane.

One example of a cationic photoinitiator is Cyracure® UVI-6974, while a preferred cationic thermoinitiator is 1-methylimidazole.

These initiators may be used in the normal amounts known to the skilled worker, e.g., from 0.01 to 5% by weight, in particular from 0.1 to 2% by weight, based on the total solids content of the coating sol. In some cases it is of course possible in certain circumstances to do without the initiator entirely.

The crosslinking in step b) of the process of the invention takes place preferably thermally or by irradiation (in particular with UV light). Conventional light sources can be used for photopolymerization, especially sources which emit UV light, e.g., mercury vapor lamps, xenon lamps and laser light. In the case of crosslinking by way of heat treatment the appropriate temperature range depends naturally in particular on the extant polymerizable and/or polycondensable surface groups of the nanoscale inorganic particulate solids, on any initiators used, on the degree of dilution, and the duration of the treatment.

Generally speaking, heat treatment for crosslinking in b) and d) takes place within a temperature range from 20 to 130° C., preferably from 80 to 120° C., in particular from 100 to 120° C. The duration of the treatment may be, for example, from 30 seconds to 5 minutes, preferably from 1 to 2 minutes. Steps b) and d) are performed such that at least partial crosslinking has taken place by way of the polymerizable and/or polycondensable surface groups; it is also possible for substantially all of the polymerizable and/or polycondensable surface groups to be consumed by reaction for the crosslinking in this step.

In the course of heat treatment, further volatile constituents, especially the solvent, may evaporate from the coating composition before, during or after crosslinking, generally at the same time as crosslinking. Where no heat treatment is carried out for crosslinking, a heat treatment (for drying) may be performed following crosslinking.

The rate at which the coating composition is applied is chosen, as a function of the desired refractive index and field of application, generally in such a way as to obtain dry film thicknesses in the range from 50 to 300 nm, preferably from 100 to 150 nm.

In accordance with steps c) and d) and, where appropriate, e), one or more further layers are applied to the solidified layer formed, in analogy to steps a) and b), until the desired assembly of layers is obtained. In the case of the last (topmost) layer there is no longer absolute need for a separate crosslinking step as per b) and/or d); instead, crosslinking can be carried out, if desired, directly together with the final heat treatment step f) for aftertreating the layer assembly.

In step f), the layer assembly undergoes heat treatment. The heat treatment depends naturally on the film and on the composition of the layers. Generally speaking, however, the final heat treatment takes place at temperatures in the range from 20 to 200° C., preferably from 80 to 200° C., more preferably from 100 to 160° C., and in particular from 110 to 130° C. The duration of the heat treatment is, for example, from 10 minutes to 24 h, preferably from 3 minutes to 1 h. This gives multilayer interference systems on polymer film without cracking or other defects.

Within the layers and/or within the layer assembly, the final heat treatment of the layer assembly may lead, for example, to substantial completion of the organic crosslinking or, where appropriate, may remove any residues of solvent present. During the heat treatment there may also be condensation reactions between the reactive groups still present on the surface of the particulate solids (e.g., (Si)—OH groups on $SiO_2$ particles), so that the solids particles within the layers are linked to one another by inorganic condensation reactions as well as the organic crosslinking elucidated above.

In one particularly preferred embodiment it is possible to select the coating compositions such that, in the finished polymer film with multilayer interference system, residual reflection values of below 0.5% in the range between 400 nm and 650 nm wavelength, and residual reflection values below 0.3% at a wavelength of 550 nm, are obtained.

Depending on the end application, further treatment steps may follow. On the side opposite the side bearing the multilayer system, for example, the coated film may be provided with an adhesive layer and, where appropriate, with a top layer. The adhesive layer may serve, for example, for lamination to a substrate. A continuous film can be cut to size in order to obtain dimensions suitable for the end application.

The polymer film of the invention with multilayer interference system applied thereto is particularly suitable as an optical laminating film for glass and plastics substrates. Accordingly, the invention also provides a composite material comprising a film, a paint layer or a substrate, in particular a rigid substrate, which is preferably composed of glass or plastic and is preferably transparent, onto which the polymer film of the invention is laminated.

Suitable laminating techniques are known to the skilled worker, and any customary laminating techniques can be employed. Joining takes place, for example, by way of an adhesive layer, which may be applied to the film, to the substrate, or to both. Where needed, an interference layer may also be applied to the reverse side of the substrate.

The polymer films with multilayer interference system produced in accordance with the invention, or the corresponding composite materials, are suitable, for example, as antireflection systems, especially to reduce glare, as reflection systems, reflection filters, and color filters for lighting purposes or for decorative purposes.

Examples of specific applications for the polymer films with multilayer interference system produced in accordance with the invention, and the corresponding composite materials, include the following:

antireflection systems and antireflection coatings for visible light in the field of architecture, e.g., screens or windows in buildings, glazing for shop windows and pictures, for glasshouses, for glazing within vehicles, e.g., automobiles, trucks, motorbikes, boats, and aircraft; or for instruments with a display element, e.g., computer screens, television screens, or cellphone displays;

coated films in roll form with optical and/or decorative effect;

NIR (near infrared) reflection filters;

antiglare coatings (NIR, Vis), e.g., for photovoltaic and other optical applications (solar cells, solar collectors);

color filters for lighting or for decorative purposes;

IR reflection coat for fire protection and heat protection applications;

optical films, such as polarization films, retarder films;

effect coating on painted surfaces;

UV reflection films; and laser mirrors.

EXAMPLE

Production of a Triple Antireflection Coat

1 Synthesis of the Coating Sols

The antireflection coating sols M, H, and L (M: sol for layer with medium refractive index, H: sol for layer with high refractive index, L: sol for layer with low refractive index) were prepared from three base sols (H, Lr, and Lo).

1.1. Synthesis of the Base Sols (Room Temperature)

a) Base sol H 12.12 g of HCl (16.9% strength by weight) were added to a mixture of 400 g of 2-propanol and 400 g of 1-butanol. 79.61 g of titanium isopropoxide were added with stirring to the solvent mixture. Synthesis is complete after stirring for 24 hours.

b) Base Sol Lr 105.15 g of tetraethoxysilane were dissolved in 60 g of ethanol. Additionally, a solution was prepared from 41.5 g of HCl (0.69% strength by weight) and 60 g of ethanol and was added with stirring to the tetraethoxysilane/ethanol mixture. After a reaction time of 2 hours the sol was diluted with 500 g of 2-propanol and 500 g of 1-butanol.

c) Base Sol Lo 360.8 g of tetramethoxysilane were dissolved in 319.2 g of ethanol. Additionally, a solution was prepared from 6.9 g of HCl (37% strength by weight), 362.5 g of water and 319.2 g of butanol. This solution was added with stirring to the tetramethoxysilane/ethanol mixture. Synthesis is complete after stirring for 2 hours.

1.2. Preparation the Coating Sols (about 1 l of Sol)

a) Sol M 76.8 g of base sol Lr were mixed with 419.2 g of base sol H. 2.976 g of 1,4-cyclohexanedimethanol diglycidyl ether (CHMG) were added dropwise with stirring to this mixture. The sol was diluted with 321.6 g of 1-butanol.

b) Sol H 1.2 g of 1,4-cyclohexanedimethanol diglycidyl ether (CHMO) were added dropwise with stirring to 480 g of base sol H. The sol was diluted with 321.6 g of 1-butanol.

c) Sol L 201.6 g of base sol Lo were diluted with 624 g of 1-butanol. 1.44 g of prehydrolyzed glycidyloxypropyltrimethoxysilane (hydrolysis with 0.1 N HCl (0.5 mol/mol OR) were added to this mixture, and then the solvent was removed on a rotary evaporator. Additionally, 0.072 g of aminopropyltrimethoxysliane, as thermoinitiator, was added to this mixture.

2. Coating of the Polymer Film

The polymer film used was a TAC film having a thickness of 50 μm and a hardcoat. The above coating sols M, H, and L were applied to the polymer film in succession with the aid of a reverse-roll coating unit (model BA 12300, Werner Mathis AG, Switzerland). The film tension for all 3 coatings is 60 N. Initial crosslinking of all three applied coatings was carried out at an oven temperature of 120° C. for a period of 2 minutes. For after treatment the applied layer assembly in roll form was treated in a preheated oven at 120° C. for 30 minutes, then removed and cooled to room temperature. The result was a flawless multilayer interference system on the polymer film, having the desired interference behavior.

For the application of the 3 layers the following coating parameters were set for the reverse-roll coating:

| Sol | Roller | Rotation | Speed (m/min) | Nip (μm) |
|---|---|---|---|---|
| M | Dip roller | left | 1.0 | |
| | Transfer roller | left | 1.0 | Between dip and transfer roll = 100 |
| | Master roller | right | 1.0 | Between dip and transfer roll = 100 |
| H | Dip roller | left | 1.0 | |
| | Transfer roller | left | 1.0 | Between dip and transfer roll = 150 |
| | Master roller | right | 1.0 | Between dip and transfer roll = 100 |
| L | Dip roller | left | 1.0 | |
| | Transfer roller | left | 1.0 | Between dip and transfer roll = 100 |
| | Master roller | right | 1.0 | Between dip and transfer roll = 100 |

What is claimed is:

1. A polymer film on which there has been applied a multilayer optical interference system comprising at least two organically modified inorganic layers, each layer consisting of a solidified composite consisting of nanoscale inorganic particulate solids covalently crosslinked by organic surface groups,
   wherein each layer is formed by applying a coating sol comprising nanoscale inorganic particulate solids having polymerizable organic surface groups on the surface of the particulate solids, and solidifying the coating sol.

2. The polymer film as claimed in claim 1, wherein the, at least two layers have different refractive indices.

3. The polymer film as claimed in claim 1, wherein the solidified composite coating composition is a sol.

4. The polymer film as claimed in claim 1, wherein the nanoscale particulate solids are selected from the group consisting of: $SiO_2$, $TiO_2$, $ZrO_2$, $Ta_2O_5$, and mixtures thereof.

5. The polymer film as claimed in claim 1, wherein the organic surface groups are selected from organic radicals which possess an acyl, methacryloyl, vinyl, allyl, or epoxy group.

6. A composite material comprising a substrate onto which the polymer film as claimed in claim 1 is laminated.

7. A process for producing a polymer film with a multilayer interference system, as claimed in claim 1, which comprises the following steps:
   a) applying a coating sol comprising nanoscale inorganic particulate solids having polymerizable and/or polycondensable organic surface groups to the polymer film,
   b) solidifying the coating sol applied in step a), where appropriate with crosslinking of the polymerizable and/or polycondensable organic surface groups of the particulate solids, to form an at least partly organically crosslinked layer,
   c) applying a further coating sol comprising nanoscale inorganic particulate solids having polymerizable and/or polycondensable organic surface group to the layer solidified in step b),
   d) solidifying the coating sol applied in step c), where appropriate with crosslinking of the polymerizable and/or polycondensable organic surface groups of the particulate solids, to form a further solidified layer,
   e) if desired, repeating steps c) and d) one or more times to form solidified layers, and
   f) heat-treating and/or irradiating the resultant layer assembly, it being possible to perform this step together with step d) for the topmost layer.

8. The process as claimed in claim 7, wherein a coating sol having a total solids content of not more than 40% by weight is applied.

9. The process as claimed in claim 7, wherein the heat treatment step f) of the layer assembly is conducted at temperatures in the range from 20 to 200° C.

10. The process as claimed in claim 7, wherein the coatings are applied by reverse-roll coating.

11. An antireflection system, reflection system, reflection filter, color filter, light intensifier, polarization filter, retarder film or effect coating on painted surfaces which uses the polymer film as claimed in claim 1 or the composite material as claimed in claim 6.

12. The antireflection system, reflection system, reflection filter, color filter or light intensifier of claim 11 which is used in computer screens, display glasses and lenses of cellphones, architectural glass and automobile window glass.

13. The process as claimed in claim 7, wherein the heat treatment step f) of the layer assembly is conducted at temperatures in the range from 80 to 200° C.

14. The polymer film of claim 1, wherein the multilayer optical interference system comprising at least two layers has a residual reflection of less than 0.5% in the range 400 nm to 650 nm.

15. The polymer film of claim 1, wherein the multilayer optical interference system comprising at least two layers further exhibits a residual reflection of less than 0.3% at 550 nm.

* * * * *